US012656781B2

(12) United States Patent

Tsuzuki

(10) Patent No.: US 12,656,781 B2
(45) Date of Patent: Jun. 16, 2026

(54) METHOD FOR CONTROLLING A VEHICLE USING VQA MODEL

(71) Applicant: TOYOTA JIDOSHA KABUSHIKI KAISHA, Aichi-ken (JP)

(72) Inventor: Yuta Tsuzuki, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 68 days.

(21) Appl. No.: 18/739,222

(22) Filed: Jun. 10, 2024

(65) Prior Publication Data

US 2025/0377658 A1 Dec. 11, 2025

(51) Int. Cl.
G05D 1/222 (2024.01)
G05D 109/10 (2024.01)
G05D 111/10 (2024.01)
G06V 20/56 (2022.01)

(52) U.S. Cl.
CPC ............. G05D 1/222 (2024.01); G06V 20/56 (2022.01); G05D 2109/10 (2024.01); G05D 2111/10 (2024.01)

(58) Field of Classification Search
CPC ........ G05D 1/222; G06V 30/40; G06V 40/45; B60W 10/20; G07C 9/00563; E05F 15/76; G06F 18/24
See application file for complete search history.

(56) References Cited

U.S. PATENT DOCUMENTS

| | | | | |
|---|---|---|---|---|
| 11,810,200 | B1 * | 11/2023 | Meyer | .................... G06F 18/24 |
| 2017/0101110 | A1 * | 4/2017 | Yoo | ........................ B60W 10/20 |
| 2022/0129693 | A1 * | 4/2022 | Pham | ..................... G06V 30/40 |
| 2022/0371622 | A1 | 11/2022 | Malla | |
| 2024/0166223 | A1 | 5/2024 | Esna Ashari Esfahani | |

FOREIGN PATENT DOCUMENTS

| | | | | | |
|---|---|---|---|---|---|
| CA | 3086209 | C | * | 3/2023 | .............. E05F 15/76 |
| CN | 114495337 | A | * | 5/2022 | ......... G07C 9/00563 |
| WO | WO-2024116290 | A1 | * | 6/2024 | ............. G06V 40/45 |

* cited by examiner

*Primary Examiner* — Yuri Kan
(74) *Attorney, Agent, or Firm* — HAUPTMAN HAM, LLP

(57) ABSTRACT

A system/method of performance of operations including receiving an image of a candidate object of interest or user (CoI/U) captured by a camera installed in a vehicle. The performance of operations including inputting a first dataset into a VQA model, the first data set including the image and a first question associated with the CoI/U. The performance of operations including obtaining an answer to the first question as an output from the VQA model. The performance of operations including executing an operation of the vehicle based on the answer.

19 Claims, 2 Drawing Sheets

METHOD FOR CONTROLLING A VEHICLE USING VQA MODEL

BACKGROUND

A Visual Question Answering (VQA) learning model is installed in a vehicle, and is able to be used by the vehicle to acquire an image and prompt a result from the learning model based on the image. A VQA learning model is able to be used in computer in vision and facilitates training/ teaching a machine to understand the content of the image and answer a question, or plurality of questions about the image, and is able to do so in such a way that is more accurate than use of non-pictorial data. The machine is able to answer the question(s) in a natural language. Once the learning model is trained, significant resources, such as large amounts of storage space, memory, and processing power is necessary to obtain a result or interference(s) based on the question asked to the machine about the image. Traditional VQA models are based on images already saved in a database, and are limited in ability to process images as the images are being captured/generated in real time with negligible latency, and create a dataset which pairs an image with a question to obtain an answer and perform a vehicle operation.

SUMMARY

A non-transitory computer-readable medium including instructions that, in response to execution by one or more processors, cause performance of operations including receiving an image of a candidate object of interest captured by a camera installed in a vehicle. The performance of operations including inputting a first data set into a visual question answering (VQA) model, the first data set including the image and a first question associated with the candidate object of interest. The performance of operations including obtaining an answer to the first question as an output from the VQA model. The performance of operations including executing an operation of the vehicle based on the answer.

An aspect of this description relates to a method of implementing a vehicle operation. A method including receiving of an image of a candidate object of interest captured by a camera installed in a vehicle. The method including inputting of a first data set into a VQA model, the first data set including the image and a first question associated with the candidate object of interest. The method including obtaining of an answer to the first question as an output from the VQA model. The method including executing of, by a controller in the vehicle, an operation of the vehicle based on the answer of the first data set.

An aspect of this description relates to a vehicle. A device including a controller including circuitry configured to perform an operation of a vehicle including executing an operation of the vehicle based on an answer of a first data set. The device including a processor configured to receive an image of a candidate object of interest captured by a camera installed in the vehicle information of a candidate object of interest or user approaching or in proximity to the vehicle detected by a sensor on the vehicle. The device including a processor configured to receive an image of the candidate object of interest or user captured by an image acquisition unit input the first data set into a VQA model, the first data set comprising the image and a first question associated with the candidate object of interest. The device including a processor configured to obtain an answer to the first question as an output from the VQA model.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
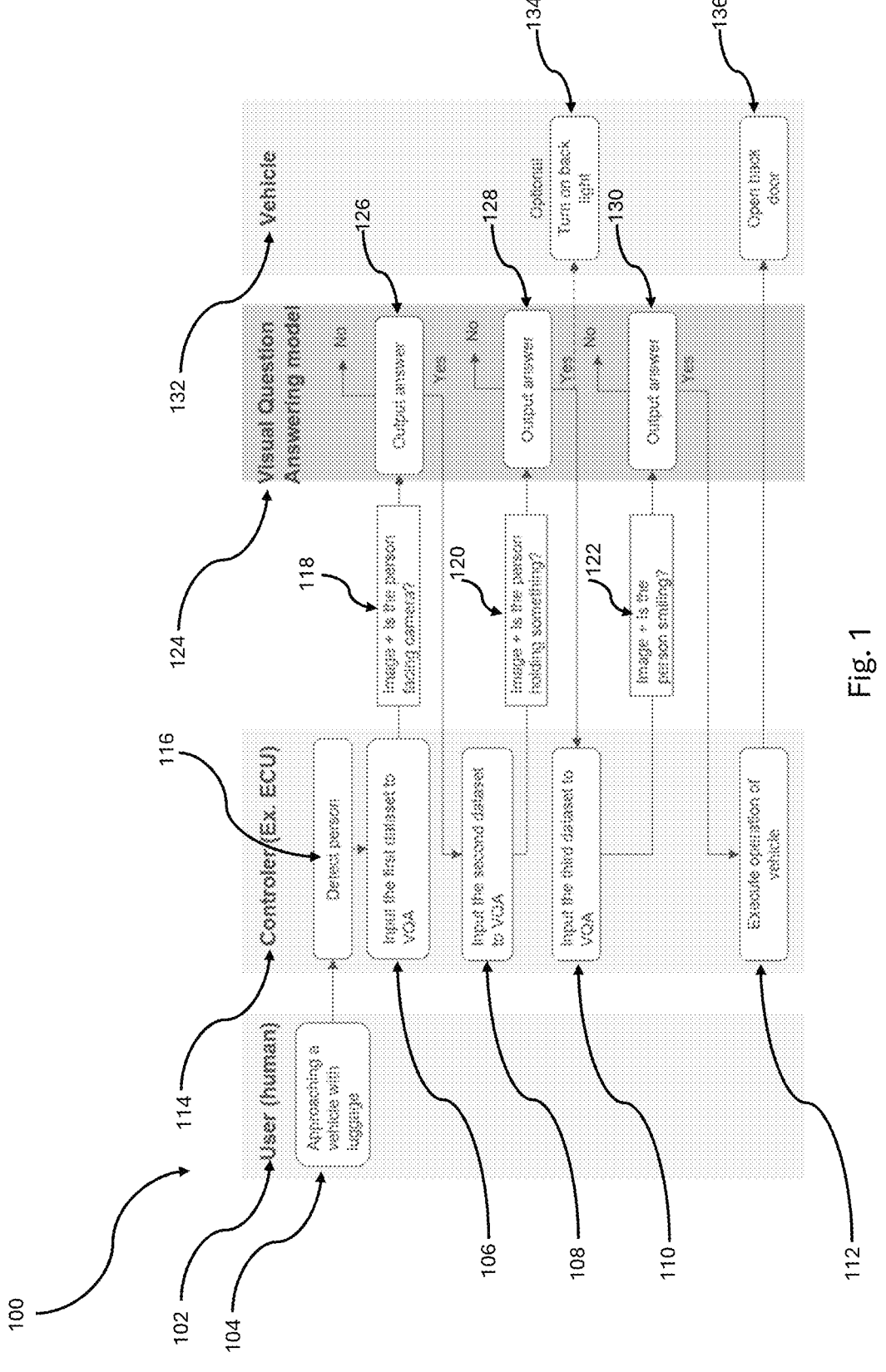
FIG. 1 is an operational flow chart for control of a vehicle operation via a visual question answering (VQA) model, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Developing an image recognition model suitable for a variety of use cases has challenges, such as data for training the image recognition model, thereby consuming heavy computing work for teaching/training the model. Also, multiple models installed in a vehicle to perform image recognition for controlling different vehicle operations presents an increase in computational load on the vehicle. An increase in computational load on a vehicle adversely impacts the other functions of the vehicle.

In at least one embodiment, the method relates to inputting a data set. In at least one embodiment, a data set includes an image and a question. In at least one embodiment, the data set is able to be input into a VQA model. In at least one embodiment, the VQA model is able to be installed in a vehicle at least one time. In at least one embodiment, the VQA model is able to be installed in a vehicle a plurality of times. In at least one embodiment, an output of the VQA model is an answer to the question. In at least one embodiment, the question is able to be asked in a machine/computer language. In at least one embodiment, the question is able to be asked in a natural language. In at least one embodiment, the answer is able to be retrieved in a machine/computer language. In at least one embodiment, the answer is able to be retrieved in a natural language. In at least one embodiment, the VQA model is able to be installed in the vehicle, for example, installed in a memory physically in the vehicle. In at least one embodiment, the VQA model is able to be installed on a storage device physically in the vehicle. In at least one embodiment, the VQA model is able to be installed on a cloud storage device. In at least one embodiment, the VQA model installed on the cloud storage device is able to be accessible via a cloud server.

In at least one embodiment, the data set is able to be input into the VQA model. In at least one embodiment, the data set includes at least two data sets. In at least one embodiment, each data set includes an image and a question. In at least one embodiment, each data set is able to be input into the VQA model multiples times. In at least one embodiment, a first data set and a second data set are able to be input into the VQA model at a first instance/time. In at least one embodiment, the first data set and the second data set are able to be input into the VQA model at a second instance/time.

In at least one embodiment, the controlling of the vehicle is based on an answer to the natural language question. In at least one embodiment, a VQA model is able to be allocated to a perspective or angle in which an image is acquired by at least one camera. In at least one embodiment, the image is able to be an image of a driver which is acquired by the at least one camera. In at least one embodiment, the at least one camera is able to be inside of the vehicle. In at least one embodiment, the image is able to be an image of an occupant of the vehicle other than the driver which is able to be acquired by the at least one camera inside of the vehicle. In at least one embodiment, the image is an image of a surrounding area/exterior area of the vehicle which is able to be acquired by at least one camera outside of the vehicle.

In at least one embodiment, the image is an image according to the aforementioned images, but is acquired by a mobile device/terminal of a driver of the vehicle. In at least one embodiment, the image is an image according to the aforementioned images, but is acquired by a mobile device/terminal of an occupant of the vehicle other than the driver of the vehicle. In at least one embodiment, the image is an image acquired by a vehicle other than the subject vehicle, in other words a vehicle adjacent to the subject vehicle within a field of view of a camera of the vehicle other than the subject vehicle. In at least one embodiment, the image acquired by the mobile device/terminal of the driver or the occupant of the vehicle is able to be communicated, via wire/wireless connection, to at least one of the VQA models.

In FIG. 1, an operational flow chart for control of a vehicle operation via a VQA model 100 is disclosed according to at least some embodiments of the subject disclosure. The following is an example of one use-case scenario, but the underlying method is similar in other use-case scenarios. In at least one embodiment, a user 102 approaches the subject vehicle. In at least one embodiment, the user is a person. In at least one embodiment, the user is holding on to an object 104, for example, a piece of luggage. In at least one embodiment, the user approaches the subject vehicle holding on to the object. In at least one embodiment, the user approaches the subject vehicle without holding on to the object.

In at least one embodiment, a controller 114 is configured to detect a person approaching the subject vehicle 116. In at least one embodiment, the controller 114 is configured to detect the person via a motion sensor. In at least one embodiment, the controller 114 is configured to detect the person via an image acquisition unit, for example, a camera/video camera.

In at least some embodiments, the controller 114 is in communication with VQA model 124. In at least some embodiments, the controller 114 is configured to host and execute the functions of the VQA model 124. In at least some embodiments, the controller 114 is configured to execute a vehicle operation. In at least some embodiments, the controller 114 includes a microcontroller unit (MCU), a microprocessor unit (MPU), an electronic controller unit (ECU), which is configured to execute instructions stored in a memory component.

In at least some embodiments, the controller 114 includes a memory component, such as a random access memory (RAM), read-only memory (ROM), or flash memory, which is configured to store instructions and data. In at least some embodiments, the controller 114 includes a storage component, such as a hard disk drive (HDD) or a solid-state drive (SSD), which is configured to store data long-term. In at least some embodiments, the controller 114 includes an input/output (I/O) interface, which is configured to communicate with external devices, such as the image acquisition unit 118. In at least some embodiments, the controller 114 is an embedded system specifically designed for vehicles.

In at least one embodiment, the first data set is input into the VQA model 106. In at least one embodiment, the first data set includes an image, a question, and an answer. In at least one embodiment, the image is able to be captured by a camera, for example, a camera able to take a still photo or video. In at least one embodiment, the camera is able to focus on the user holding on to the object.

In at least one embodiment, the input is combined/paired with a question/query 118. In at least one embodiment, the question/query combined/paired with the image asks "whether the user is facing the camera?" 118. In at least one embodiment, the VQA model 124 outputs an answer 126. In at least one embodiment, the VQA model outputs the answer "No", and in response to the answer "No" the controller does not perform a vehicle operation 126. In at least one embodiment, the VQA model outputs an answer. In at least one embodiment, the VQA model outputs the answer "Yes", and in response to the answer "Yes" the controller 114 is able to perform a vehicle operation 126.

In at least one embodiment, in response to the first data set indicating the answer "Yes" the controller is prompted/triggered to input a second data set into the VQA model 108. In at least one embodiment, the second data set includes an image, a question, and an answer. In at least one embodiment, the image is captured by a camera like the one disclosed above. In at least one embodiment, the camera is able to focus on the user holding on to the object.

In at least one embodiment, the input of the second data set 108 is combined/paired with the question 120. In at least one embodiment, the question combined/paired with the image asks "whether the user is holding something?" 120. In at least one embodiment, the VQA model 124 outputs an answer 128. In at least one embodiment, the VQA model outputs the answer "No", and in response to the answer "No" the controller does not perform a vehicle operation 128. In at least one embodiment, the VQA model outputs an answer. In at least one embodiment, the VQA model outputs the answer "Yes", and in response to the answer "Yes" the controller is able to perform a vehicle operation 128. In at least one embodiment, the VQA model outputs the answer "Yes", and in response to the answer "Yes" the controller 114 performs a second vehicle operation 134.

In at least one embodiment, in response to the second data set indicating the answer "Yes" the controller is prompted/triggered to input a third data set 110 into the VQA model 124. In at least one embodiment, the third data set includes an image, a question, and an answer. In at least one embodiment, the image is captured by a camera like the one disclosed above. In at least one embodiment, the camera is able to focus on a facial expression of the user.

In at least one embodiment, the input of the third data set 110 is combined/paired with the question 122. In at least one embodiment, the question combined/paired with the image asks "whether the user is making a facial expression?" 122. In at least one embodiment, the VQA model 124 outputs an answer. In at least one embodiment, the VQA model 124 outputs the answer "No", and in response to the answer "No" the controller 114 does not perform a vehicle operation 130. In at least one embodiment, the VQA model 124 outputs an answer. In at least one embodiment, the VQA model 124 outputs the answer "Yes", and in response to the answer "Yes" the controller does is able to perform a vehicle operation 130.

In at least one embodiment, if the VQA model outputs "Yes" then the operation proceeds. In at least one embodiment, the controller is able to receive the answer, and the controller proceeds to input the second data set. In at least one embodiment, the second data set is able to be a same image as the image of the first data set but combined/paired with a different question. In at least one embodiment, a subsequent data set is able to be the same image with a different question with respect to a preceding data set. In at least one embodiment, a subsequent data set is able to be a different image with a different question with respect to a preceding data set. In at least one embodiment, a subsequent data set is able to be a different image with the same question with respect to a preceding data set. In at least one embodiment, the second data set is combined/paired with the question "whether the user is holding something?". In at least one embodiment, if the output answer of the VQA model is "No" then the operation stops. In at least one embodiment, if the output answer of the VQA model is "Yes" then the controller proceeds to input the third data set. In at least one embodiment, the third data set is combined/paired with the question "whether the user is smiling?". In at least one embodiment, if the output answer of the VQA model is "No" then the operation stops. In at least one embodiment, if the output answer of the VQA model is "Yes" then the controller proceeds to execute the operation of the vehicle, for example whatever the controller is responsible for, like opening the back door/trunk. In at least one embodiment, if the controller recognizes the user is facing the camera and the user is holding the piece of luggage, the controller is able to, in addition to executing the operation, turn on the back light of the vehicle.

In at least one embodiment, the control is able to form a question by referral to a sequence where the controller, based on the sequence, captures an image from a camera and pair the image with a predefined question to form the dataset, and input the data set into the VQA model. In other words, the controller commands are based on predefined cameras and predefined views of the cameras.

In at least one embodiment, the controller is able to perform a predetermined vehicle operation based on a binary answer to a question, "yes" or "no". In at least one embodiment, the controller is able to perform a predetermined vehicle operation based on a non-binary answer to a question. In at least one embodiment, the answer is able to be a whole number. In at least one embodiment, the answer is able to be a fractional number.

In at least one embodiment, the controller, rather than generate unprompted predetermined questions to initiate a sequence ending in performing of a predetermined vehicle operation, is configured to ask a first question based on a first image of a user, and the first question is associated with at least one predetermined question.

Figure 2:
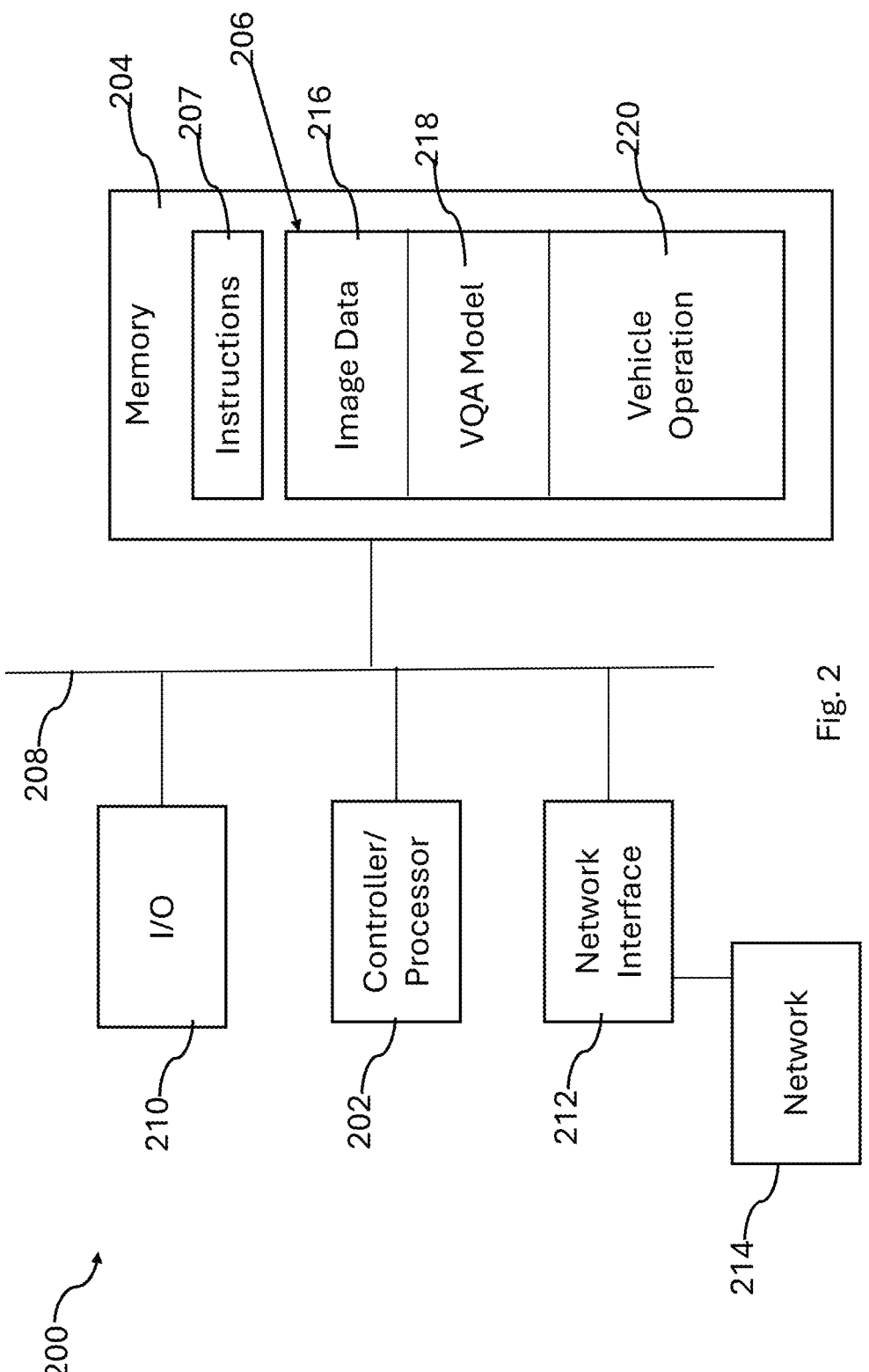
FIG. 2 is a block diagram of a hardware configuration for control of a vehicle via a VQA model, according to at least some embodiments of the subject disclosure.

FIG. 2 is a block diagram of a hardware configuration for executing a vehicle operation based on an answer output from a VQA model, according to at least some embodiments of the subject disclosure.

The exemplary hardware configuration includes controller 202, which interacts with the VQA model 218 directly or through network 214. In at least some embodiments, network 214 is an ethernet network, a Controller Area Network (CAN), or any other wire or wireless network or a combination thereof. In at least some embodiments, the controller 202 is a computer system that executes computer-readable instructions to perform vehicle operations.

In at least some embodiments, the controller 202 includes a processor or programmable circuitry executing instructions to cause the processor or programmable circuitry to perform operations according to the instructions 207. In at least some embodiments, the controller 202 includes analog or digital programmable circuitry, or any combination thereof. In at least some embodiments, the controller 202 includes physically separated storage or circuitry that interacts through communication. In at least some embodiments, storage unit 204 includes a non-volatile computer-readable medium capable of storing executable and non-executable data for access by controller 202 during execution of the instructions. Communication interface 208 transmits and receives data from network 214. Input/output interface 210 connects to various input and output units via a parallel port, a serial port, a keyboard port, a mouse port, a monitor port, and the like to accept commands and present information. In some embodiments, storage unit 204 is external from the controller 202.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes are be performed in the described order.

In at least some embodiments, vehicle operations in response to output of the VQA model are performed by a processor executing instructions in accordance with the foregoing operations or a device comprising a controller including circuitry configured to perform the foregoing operations.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

Supplemental Note 1

An aspect of this description relates to a vehicle and vehicle operations. A non-transitory computer-readable medium including instructions that, in response to execution by one or more processors, cause performance of operations including receiving an image of a candidate object of interest captured by a camera installed in a vehicle. The performance of operations including inputting a first data set into a visual question answering (VQA) model, the first data set including the image and a first question associated with the candidate object of interest. The performance of operations including obtaining an answer to the first question as an output from the VQA model. The performance of operations including executing an operation of the vehicle based on the answer.

Supplemental Note 2

The vehicle operations according to Supplemental Note 1, the operations further including triggering, in response to the answer of the first dataset, inputting a second data set into the VQA model, the second data set including the image of the first data set and a second question associated with the candidate object of interest. The operations further including obtaining an answer to the second question as an output from the VQA model.

Supplemental Note 3

The vehicle operations according to Supplemental Note 1 or Supplemental Note 2, wherein the inputting of the first data set and the second data set occurs a plurality of times, and the inputting of the second data set occurs after the inputting of the first data set.

Supplemental Note 4

The vehicle operations according to Supplemental Notes 1-3, wherein the first question is based on a pointing direction of the candidate object of interest relative to the camera.

Supplemental Note 5

The vehicle operations according to Supplemental Notes 1-4, wherein the candidate object of interest includes a vehicle occupant, a speed of the vehicle, a change in a pointing direction of a pointing motion of the candidate object of interest with respect to an interior of the vehicle.

Supplemental Note 6

The vehicle operations according to Supplemental Notes 1-5, wherein a name of the candidate object of interest is highlighted in a graphical user interface (GUI).

Supplemental Note 7

The vehicle operations according to Supplemental Notes 1-6, further including a data set other than the first data set and the second data set.

Supplemental Note 8

An aspect of this description relates to a method of implementing a vehicle operation. A method including receiving of an image of a candidate object of interest captured by a camera installed in a vehicle. The method including inputting of a first data set into a VQA model, the first data set including the image and a first question associated with the candidate object of interest. The method including obtaining of an answer to the first question as an output from the VQA model. The method including executing of, by a controller in the vehicle, an operation of the vehicle based on the answer of the first data set.

Supplemental Note 9

The method of vehicle operations according to Supplemental Note 8, further including triggering, in response to the answer of the first data set, inputting of a second data set into the VQA model, the second data set comprising the image of the first data set and a second question associated with the candidate object of interest. The method of vehicle operations further including obtaining of an answer to the second question as an output from the VQA model.

Supplemental Note 10

The method of vehicle operations according to Supplemental Note 8 or Supplemental Note 9, wherein the inputting of the first data set and the second data set occurs a plurality of times, and the inputting of the second data set occurs after the inputting of the first dataset.

Supplemental Note 11

The method of vehicle operations according to Supplemental Notes 8-10, wherein the first question is based on a pointing direction of the candidate object of interest relative to the camera.

Supplemental Note 12

The method of vehicle operations according to Supplemental Notes 8-11, wherein the candidate object of interest includes a vehicle occupant, a speed of the vehicle, a change in a pointing direction of a pointing motion of the candidate object of interest with respect to an interior of the vehicle.

Supplemental Note 13

The method of vehicle operations according to Supplemental Notes 8-12, wherein a name of the candidate object of interest is highlighted in a GUI.

Supplemental Note 14

The method of vehicle operations according to Supplemental Notes 8-13, further including a data set other than the first data set and the second data set.

Supplemental Note 15

An aspect of this description relates to a vehicle. A device including a controller including circuitry configured to perform an operation of a vehicle including executing an operation of the vehicle based on an answer of a first data set. The device including a processor configured to receive an image of a candidate object of interest captured by a camera installed in the vehicle. The device including a processor configured to input the first data set into a VQA model, the first data set comprising the image and a first question associated with the candidate object of interest. The device including a processor configured to obtain an answer to the first question as an output from the VQA model.

Supplemental Note 16

The device according to Supplemental Note 15, further configured to trigger, in response to the answer of the first data set input of a second data set into the VQA model, the second data set including the image of the first data set and a second question associated with the candidate object of interest. The device is further configured to obtain an answer to the second question as an output from the VQA model.

Supplemental Note 17

The device according to Supplemental Note 15 or Supplemental Note 16, wherein the input of the first data set and the second data set occurs a plurality of times, and the input of the second data set occurs after the input of the first data set.

Supplemental Note 18

The device according to Supplemental Notes 15-17, further including a microphone associated with the vehicle, the microphone configured to process context data including audio data received by the microphone within a preset time period during which the image of the candidate object of interest was acquired.

Supplemental Note 19

The device according to Supplemental Notes 15-18, wherein the candidate object of interest includes a vehicle occupant, a speed of the vehicle, a change in a pointing direction of a pointing motion of the candidate object of interest with respect to an interior of the vehicle.

Supplemental Note 20

The device according to Supplemental Notes 15-19, wherein a name of the candidate object of interest is highlighted in a GUI.

What is claimed is:

1. A non-transitory computer-readable medium comprising instructions that, in response to execution by one or more processors, cause performance of an operation comprising:
in response to detecting, via a sensor of a vehicle, an entity proximate to the vehicle, receiving an image of the entity as a candidate object of interest captured by a camera installed in the vehicle;
inputting a first data set into a visual question answering (VQA) model, the first data set comprising the image and a first question associated with determining a first observable condition related to the candidate object of interest;
obtaining a first answer to the first question as an output from the VQA model;
in response to determining that the first answer satisfies a first predefined logical condition, inputting a second data set into the VQA model, the second data set comprising the image and a second question associated with determining a second observable condition related to the candidate object of interest;
obtaining a second answer to the second question as an output from the VQA model; and
executing the operation of the vehicle in response to determining that the second answer satisfies a second predefined logical condition.

2. The computer-readable medium of claim 1, wherein the first question is "whether the user is facing the camera?" and the first predefined logical condition is that the first answer is affirmative.

3. The computer-readable medium of claim 1, wherein the second question is "whether the user is holding something?" and the second predefined logical condition is that the second answer is affirmative.

4. The computer-readable medium of claim 1, wherein the operation of the vehicle comprises unlocking a door or activating a tailgate of the vehicle.

5. The computer-readable medium of claim 1, wherein the inputting of the first data set and the second data set occurs a plurality of times, and the inputting of the second data set occurs after the inputting of the first data set.

6. The computer-readable medium of claim 1, wherein a name of the candidate object of interest is highlighted in a graphical user interface (GUI).

7. The computer-readable medium of claim 1, wherein the candidate object of interest comprises a vehicle occupant.

8. A method comprising:
in response to detecting, via a sensor of a vehicle, an entity proximate to the vehicle, receiving of an image of the entity as a candidate object of interest captured by a camera installed in the vehicle;
inputting of a first data set into a VQA model, the first data set comprising the image and a first question associated with determining a first observable condition related to the candidate object of interest;
obtaining of a first answer to the first question as an output from the VQA model;
in response to determining that the first answer satisfies a first predefined logical condition, inputting of a second data set into the VQA model, the second data set comprising the image and a second question associated with determining a second observable condition related to the candidate object of interest;
obtaining of a second answer to the second question as an output from the VQA model; and
executing of, by a controller in the vehicle, an operation of the vehicle in response to determining that second answers satisfies a second predefined logical condition.

9. The method of claim 8, wherein the first question is "whether the user is facing the camera?" and the first predefined logical condition is that the first answer is affirmative.

10. The method of claim 8, wherein the second question is "whether the user is holding something?" and the second predefined logical condition is that the second answer is affirmative.

11. The method of claim 8, wherein the operation of the vehicle comprises unlocking a door or activating a tailgate of the vehicle.

12. The method of claim 8, wherein the inputting of the first data set and the second data set occurs a plurality of times, and the inputting of the second data set occurs after the inputting of the first data set.

13. The method of claim 8, wherein a name of the candidate object of interest is highlighted in a GUI.

14. A device comprising:
a controller comprising circuitry; and
a processor configured to:
in response to a detection, via a sensor of a vehicle, of an entity proximate to the vehicle, receive an image of the entity as a candidate object of interest captured by a camera installed in the vehicle;
input a first data set into a VQA model, the first data set comprising the image and a first question associated with determining a first observable condition related to the candidate object of interest;
obtain a first answer to the first question as an output from the VQA model;
in response to a determination that the first answer satisfies a first predefined logical condition, input a second data set into the VQA model, the second data set comprising the image and a second question associated with determining a second observable condition related to the candidate object of interest;
obtain a second answer to the second question as an output from the VQA model, wherein the controller is configured to execute an operation of the vehicle in response to a determination that the second answer satisfies a second predefined logical condition.

15. The device of claim 14, wherein the first question is "whether the user is facing the camera?" and the first predefined logical condition is that the first answer is affirmative.

16. The device of claim 14, wherein the second question is "whether the user is holding something?" and the second predefined logical condition is that the second answer is affirmative.

17. The device of claim 14, wherein the specific operation of the vehicle comprises unlocking a door or activating a tailgate of the vehicle.

18. The device of claim 14, further comprising a microphone associated with the vehicle, the microphone configured to process context data comprising audio data received by the microphone within a preset time period during which the image of the candidate object of interest was acquired.

19. The device of claim 15, wherein the input of the first data set and the second data set occurs a plurality of times, and the input of the second data set occurs after the input of the first data set.

* * * * *